(12) United States Patent
Gieseke et al.

(10) Patent No.: US 6,290,739 B1
(45) Date of Patent: Sep. 18, 2001

(54) AEROSOL SEPARATOR; AND METHOD

(75) Inventors: Steven Scott Gieseke; Robert Allen Dushek, both of Richfield; Carolyn J. Finnerty, Bloomington, all of MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/474,616

(22) Filed: Dec. 29, 1999

(51) Int. Cl.$^7$ ..................................................... B01D 50/00
(52) U.S. Cl. ............................. 55/330; 55/385.3; 55/482; 55/498; 55/502; 123/198 E
(58) Field of Search ................................. 55/385.3, 498, 55/502, 510, 514, 330, 350.1, 482, 503; 123/198 E

(56) References Cited

U.S. PATENT DOCUMENTS

| | | |
|---|---|---|
| Re. 21,965 | 12/1941 | Lowther . |
| Re. 35,433 | 1/1997 | Alexander, III . |
| D. 148,396 | 1/1948 | Stevens et al. . |
| D. 298,051 | 10/1988 | Matheson et al. . |
| D. 368,266 | 3/1996 | McClain et al. . |
| 991,572 | 5/1911 | Weisenstein . |
| 1,838,751 | 12/1931 | Earnest . |
| 1,856,527 | 5/1932 | Winslow . |
| 2,060,883 | 11/1936 | Lowther . |
| 2,080,988 | 5/1937 | Schulz . |
| 2,120,050 | 6/1938 | Lowther . |
| 2,178,033 | 10/1939 | Decker . |
| 2,250,200 | 7/1941 | Lowther . |
| 2,252,974 | 8/1941 | Lowther . |
| 2,273,210 | 2/1942 | Lowther et al. . |
| 2,359,485 | 10/1944 | Lowther . |
| 2,539,378 | 1/1951 | Stootman . |
| 2,547,587 | 4/1951 | Lowther . |
| 3,115,873 | 12/1963 | Hahn et al. . |
| 3,167,416 | 1/1965 | Humbert, Jr. et al. . |
| 3,263,402 | 8/1966 | Lindamood et al. . |
| 3,266,229 | 8/1966 | Witkowski . |
| 3,450,117 | 6/1969 | McHattie et al. . |
| 3,509,967 | 5/1970 | Ballard . |
| 3,589,108 | 6/1971 | Dingel et al. . |
| 3,721,069 | 3/1973 | Walker . |
| 3,754,538 | 8/1973 | Ephraim, Jr. et al. . |
| 3,789,582 | 2/1974 | Graybill . |
| 3,793,813 | 2/1974 | McAllister . |
| 3,796,025 | 3/1974 | Kasten . |
| 3,822,532 | 7/1974 | Weisgerber . |
| 4,018,580 | 4/1977 | Burkholz et al. . |
| 4,047,912 | 9/1977 | Markland . |
| 4,095,966 | 6/1978 | Isley . |
| 4,184,858 | 1/1980 | Walker . |

(List continued on next page.)

FOREIGN PATENT DOCUMENTS

| | | |
|---|---|---|
| 196 19 770 A1 | 11/1997 | (DE) . |
| 297 14 886 U1 | 11/1997 | (DE) . |
| 0 576 783 A1 | 1/1994 | (EP) . |
| 0 611 876 A1 | 8/1994 | (EP) . |
| 613386 | 11/1948 | (GB) . |
| 661649 | 11/1951 | (GB) . |
| 2 106 634 A | 4/1983 | (GB) . |
| 1711661 A3 | 2/1992 | (RU) . |

*Primary Examiner*—David A. Simmons
*Assistant Examiner*—Minh-Chau T. Pham
(74) *Attorney, Agent, or Firm*—Merchant & Gould P.C.

(57) ABSTRACT

An arrangement for separating a hydrophobic liquid phase from a gaseous stream includes a coalescer filter, a housing, a gas flow direction arrangement, and a liquid collection arrangement. The coalescer filter includes a non-woven media of fibers. The housing includes an interior having a gas flow inlet and a gas flow outlet. The liquid collection arrangement is positioned within the housing construction and is oriented for receiving liquid collected from the coalescer filter and drained therefrom.

10 Claims, 9 Drawing Sheets

U.S. PATENT DOCUMENTS

| | | |
|---|---|---|
| 4,233,042 | 11/1980 | Tao . |
| 4,236,901 | 12/1980 | Kato et al. . |
| 4,269,607 | 5/1981 | Walker . |
| 4,378,983 | 4/1983 | Martin . |
| 4,396,407 | 8/1983 | Reese . |
| 4,401,093 | 8/1983 | Gates, Jr. et al. . |
| 4,404,950 | 9/1983 | Dallman . |
| 4,409,950 | 10/1983 | Goldberg . |
| 4,425,145 | 1/1984 | Reese . |
| 4,445,912 | 5/1984 | Volk et al. . |
| 4,585,466 | 4/1986 | Syred et al. . |
| 4,602,595 | 7/1986 | Aoki et al. . |
| 4,627,406 | 12/1986 | Namiki et al. . |
| 4,632,682 | 12/1986 | Erdmannsdorfer . |
| 4,653,457 | 3/1987 | Stege . |
| 4,692,175 | 9/1987 | Frantz . |
| 4,704,143 | 11/1987 | Percy . |
| 4,724,807 | 2/1988 | Walker . |
| 4,759,782 | 7/1988 | Miller et al. . |
| 4,861,359 | 8/1989 | Tettman . |
| 4,878,929 | 11/1989 | Tofsland et al. . |
| 4,925,469 | 5/1990 | Clement et al. . |
| 4,995,891 | 2/1991 | Jaynes . |
| 5,019,141 | 5/1991 | Granville et al. . |
| 5,035,729 | 7/1991 | Hodgkins . |
| 5,039,323 | 8/1991 | Ulitsky et al. . |
| 5,046,474 | 9/1991 | Percy . |
| 5,125,941 | 6/1992 | Ernst et al. . |
| 5,140,957 | 8/1992 | Walker . |
| 5,277,157 | 1/1994 | Teich . |
| 5,347,973 | 9/1994 | Walker, Jr. . |
| 5,460,147 | 10/1995 | Bohl . |
| 5,471,966 | 12/1995 | Feuling . |
| 5,472,463 | 12/1995 | Herman et al. . |
| 5,479,907 | 1/1996 | Walker, Jr. . |
| 5,494,020 | 2/1996 | Meng . |
| 5,494,497 | 2/1996 | Lee . |
| 5,497,755 | 3/1996 | Maloney . |
| 5,564,401 | 10/1996 | Dickson . |
| 5,586,996 | 12/1996 | Manookian, Jr. . |
| 5,609,658 | 3/1997 | Takemura et al. . |
| 5,633,341 | 5/1997 | Abend . |
| 5,640,937 | 6/1997 | Slopsema . |
| 5,660,607 | 8/1997 | Jokschas et al. . |
| 5,690,709 | 11/1997 | Barnes . |
| 5,713,985 | 2/1998 | Hamilton . |
| 5,752,999 | 5/1998 | Newby et al. . |
| 5,755,843 * | 5/1998 | Sundquist ................... 55/385.3 |
| 5,759,217 | 6/1998 | Joy . |
| 5,795,369 | 8/1998 | Taub . |
| 5,800,581 * | 9/1998 | Gielink et al. ............ 55/385.3 |
| 5,853,439 | 12/1998 | Gieseke et al. . |
| 5,865,963 | 2/1999 | DeSousa et al. . |
| 5,893,937 * | 4/1999 | Moessinger ................ 55/385.3 |
| 5,902,361 | 5/1999 | Pomplun et al. . |
| 5,921,214 | 7/1999 | Fujita et al. . |
| 6,149,700 * | 11/2000 | Morgan et al. ............ 55/385.3 |

\* cited by examiner

AEROSOL SEPARATOR; AND METHOD

The present application incorporates the following commonly assigned specifications herein by reference: U.S. application Ser. No. 09/205,468 filed Dec. 4, 1998; U.S. Ser. No. 09/010,098 filed Jan. 21, 1998; U.S. Ser. No. 08/884,294, filed Jun. 27, 1997; U.S. Pat. No. 5,853,439; and U.S. Ser. No. 09/454,084, filed Dec. 3, 1999.

TECHNICAL FIELD

This disclosure relates to systems and methods for separating hydrophobic fluids (such as oils) which are entrained as aerosols, from gas streams (for example, air streams). Preferred arrangements also provide for filtration of other fine contaminants, for example carbon material, from the gas streams. Methods for conducting the separations are also provided.

BACKGROUND

Certain gas streams, such as blow-by gases from diesel engines, carry substantial amounts of entrained oils therein, as aerosol. The majority of the oil droplets within the aerosol are generally within the size of 0.1–5.0 microns.

In addition, such gas streams also carry substantial amounts of fine contaminant, such as carbon contaminants. Such contaminants generally have an average particle size of about 0.5–3.0 microns.

In some systems, it is desirable to vent such gases to the atmosphere. In general, it is preferred that before the gases are vented to the atmosphere, they be cleaned of a substantial portion of the aerosol and/or organic particulate contaminants therein.

In other instances, it is desirable to direct the air or gas stream into equipment. When such is the case, it may be desirable to separate aerosol and/or particulates from the stream during the circulation, in order to provide such benefits as: reduced negative effects on the downstream equipment; improved efficiency; recapture of otherwise lost oils; and/or to address environmental concerns.

A variety of efforts have been directed to the above types of concerns. The variables toward which improvements are desired generally concern the following:

(a) size/efficiency concerns; that is, a desire for good efficiency of separation while at the same time avoidance of a requirement for a large separator system;

(b) cost/efficiency; that is, a desire for good or high efficiency without the requirement of substantially expensive systems; (c) versatility; that is, development of systems that can be adapted for a wide variety of applications and uses, without significant re-engineering; and, (d) cleanability/regeneratability; that is, development of systems which can be readily cleaned (or regenerated) if such becomes desired, after prolonged use.

SUMMARY OF THE DISCLOSURE

A filter arrangement is provided that includes a first stage coalescer filter and a second stage filter element downstream from the coalescer filter. Preferably, the first stage coalescer filter comprises a non-woven fibrous media. The second stage filter element will preferably include pleated media. Preferred constructions will include a filter element including a tubular extension of pleated media defining an open filter interior; a first end cap at one end of the tubular extension of pleated media; the first end cap having an aperture in communication with the open filter interior; a second end cap at an end of the tubular extension of media opposite of the first end cap; the second end cap having an aperture in communication with the open filter interior; and a region of fibrous media oriented in the first end cap aperture; the region of fibrous media including first and second, opposite flow faces; the second flow face being oriented toward the open filter interior; and the first flow face being oriented away from the open filter interior.

The disclosure also describes a filter element comprising a tubular extension of media defining an open filter interior; a first end cap at one end of the tubular extension of media; the first end cap having an aperture in communication with the open filter interior; the first end cap having an outer, annular surface; the outer, annular surface comprising a polymeric material positioned to form a radial seal with a housing, when the filter element is operably mounted in a housing; and a second end cap at an end of the tubular extension of media opposite of the first end cap; the second end cap having an aperture in communication with the open filter interior; the second end cap having an outer, annular surface; the second end cap outer, annular surface comprising a polymeric material positioned to form a radial seal with a housing, when the filter element is operably mounted in a housing.

The disclosure also describes an end cap arrangement comprising a ring of compressible polymeric material; the ring having a center aperture centered in the ring and an outer, annular surface; the center aperture having a first greatest dimension across the aperture, and the ring having a second greatest dimension across the ring; the first greatest dimension being not greater than 50% of the second greatest dimension; the outer, annular surface comprising polyurethane foam having an as molded density of about 14–22 pounds per cubic foot; a frame construction oriented in the center and potted within the ring; and a region of fibrous media held by the frame construction.

The disclosure also describes a filter arrangement comprising a housing construction defining an interior and having a gas flow inlet, a gas flow outlet, and a liquid flow outlet; a filter element operably positioned in the housing construction; the filter element including: a tubular extension of media defining an open filter interior; a first end cap at one end of the tubular extension of media; the first end cap having an aperture in communication with the open filter interior; a region of fibrous media oriented in the first end cap aperture; the region of fibrous media being constructed and arranged to separate at least a portion of a liquid phase from gases with an entrained liquid; a gas flow direction arrangement constructed and arranged to direct gas flow from the gas flow inlet, through the region of fibrous media, into the open filter interior, through the tubular extension of media, and out through the gas flow outlet; and a liquid collection arrangement constructed and arranged to direct liquid collected by the region of fibrous media to the liquid flow outlet.

There is also described a diesel engine blow-by recovery system comprising: a diesel engine having a size of at least 50 HP and a crankcase; a filter arrangement in gas flow communication with the crankcase; the filter arrangement including: a housing having a gas flow inlet arrangement, a gas flow outlet arrangement, and a liquid flow outlet arrangement; a filter element operably positioned in the housing and including: a tubular extension of media defining an open filter interior; a first end cap at one end of the tubular extension of media; the first end cap having an aperture in communication with the open filter interior; a region of fibrous media oriented in the first end cap aperture; a gas flow direction arrangement constructed and arranged to direct gas flow from the gas flow inlet arrangement, through the region of fibrous media, into the open filter interior, through the tubular extension of media, and out through the gas flow outlet arrangement; and a liquid collection arrangement constructed and arranged to direct liquid collected by the region of fibrous media to the liquid flow outlet arrangement.

In another aspect, the disclosure describes a method of treating diesel engine blow-by gases; the method comprising steps of: directing blow-by gases from a diesel engine to an coalescer filter; the coalescer filter being mounted in an interior of a tubular pleated media filter; removing at least a portion of a liquid phase from the gases with the coalescer filter as a collected liquid; after the step of removing at least a portion of a liquid phase, directing the gases through the tubular pleated media filter; filtering at least a portion of particulates from the gases with the pleated media filter; and after the step of removing at least a portion of the collected liquid phase, directing drainage of at least a portion of the collected liquid from the coalescer filter, along the interior of the tubular pleated media filter, to a drain construction.

DETAILED DESCRIPTION

I. A Typical Application—Engine Crankcase Breather Filter

Pressure-charged diesel engines often generate "blow-by" gases, i.e., a flow of air-fuel mixture leaking past pistons from the combustion chambers. Such "blow-by gases" generally comprise a gas phase, for example air or combustion off gases, carrying therein: (a) oil or fuel aerosol principally comprising 0.1–5.0 micron droplets (principally, by number); and, (b) carbon contaminant from combustion, typically comprising carbon particles, a majority of which are about 0.1–10 microns in size. Such "blow-by gases" are generally directed outwardly from the engine block, through a blow-by vent.

Herein when the term "hydrophobic" fluids is used in reference to the entrained liquid aerosol in gas flow, reference is meant to nonaqueous fluids, especially oils. Generally such materials are immiscible in water. Herein the term "gas" or variants thereof, used in connection with the carrier fluid, refers to air, combustion off gases, and other carrier gases for the aerosol.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 2–50 cfm (typically 5 to 10 cfm) are fairly common.

Figure 1:
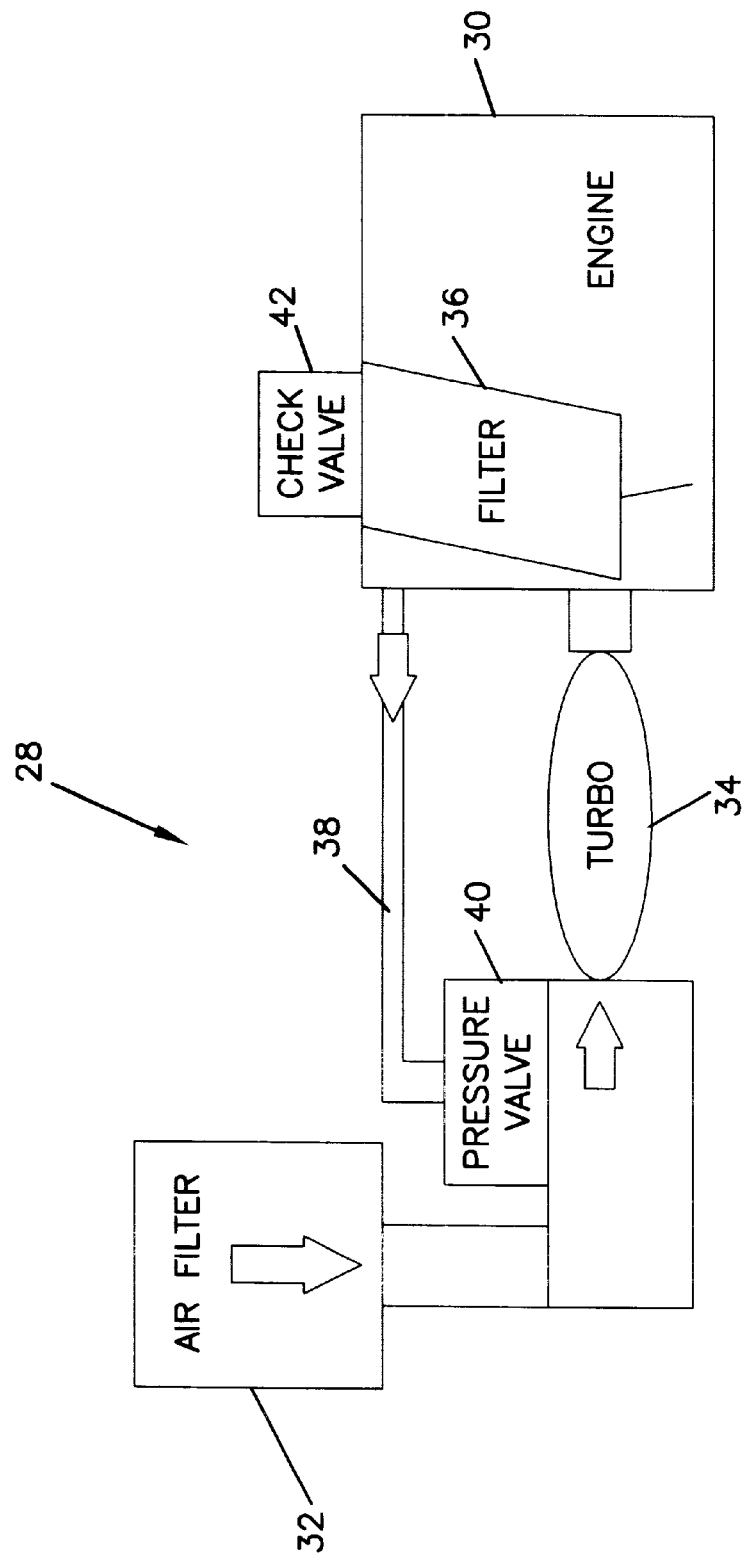
FIG. 1 is a schematic view of an engine system using a filter arrangement constructed according to principles of this disclosure.

FIG. 1 illustrates a schematic indicating a typical system 28 in which a coalescer/separator arrangement according to the present invention would be utilized. Referring to FIG. 1, block 30 represents a turbocharged diesel engine. Air is taken to the engine 30 through an air filter 32. Air filter or cleaner 32 cleans the air taken in from the atmosphere. A turbo 34 draws the clean air from the air filter 32 and pushes it into engine 30. While in engine 30, the air undergoes compression and combustion by engaging with pistons and fuel. During the combustion process, the engine 30 gives off blow-by gases. A filter arrangement 36 is in gas flow communication with engine 30 and cleans the blow-by gases. From filter arrangement 36, the air is directed through channel 38 and through a pressure valve 40. From there, the air is again pulled through by the turbo 34 and into the engine 30. Regulator valve or pressure valve 40 regulates the amount of pressure in the engine crankcase 30. Pressure valve 40 opens more and more, as the pressure in the engine crankcase increases, in order to try to decrease the pressure to an optimal level. The pressure valve 40 closes to a smaller amount when it is desirable to increase the pressure within the engine. A check valve 42 is provided, such that when the pressure exceeds a certain amount in the engine crankcase 30, the check valve 42 opens to the atmosphere, to prevent engine damage.

According to this disclosure, the filter arrangement 36 for separating a hydrophobic liquid phase from a gaseous stream (sometimes referred to herein as a coalescer/separator arrangement) is provided. In operation, a contaminated gas flow is directed into the coalescer/separator arrangement 36. Within the arrangement 36, the fine oil phase or aerosol phase (i.e., hydrophobic phase) coalesces. The arrangement 36 is constructed so that as the hydrophobic phase coalesces into droplets, it will drain as a liquid such that it can readily be collected and removed from the system. With preferred arrangements as described hereinbelow, the coalescer or coalescer/separator, especially with the oil phase in part loaded thereon, operates as a prefilter for carbon contaminant carried in the gas stream. Indeed, in preferred systems, as the oil is drained from the system, it will provide some self-cleaning of the coalescer because the oil will carry therein a portion of the trapped carbon contaminant.

II. Multi-Stage Oil Aerosol Separator Embodiment, FIGS. 2–9

Figure 2:
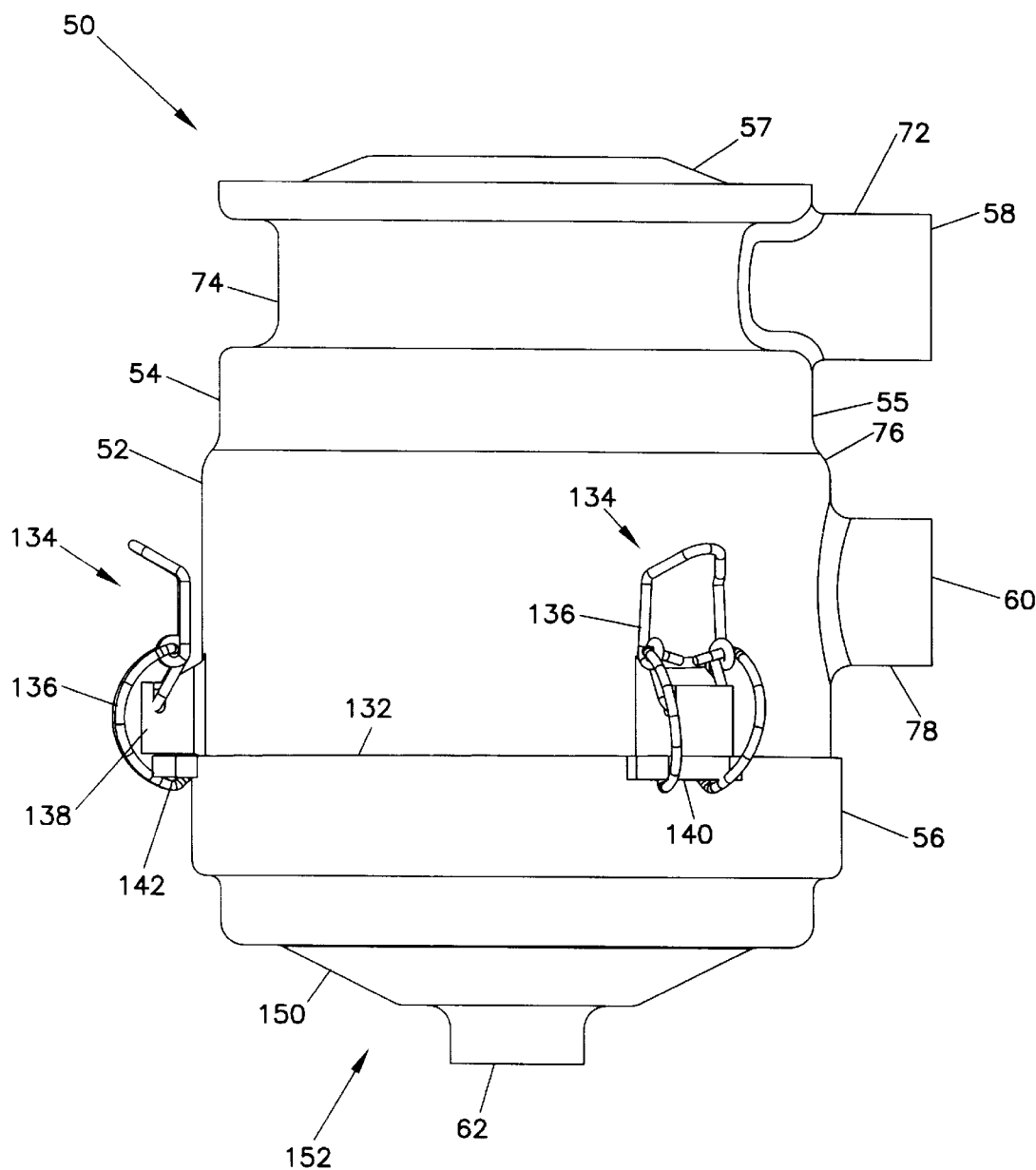
FIG. 2 is a side elevational view of one embodiment of a filter arrangement, constructed according to principles of this disclosure.
Figure 3:
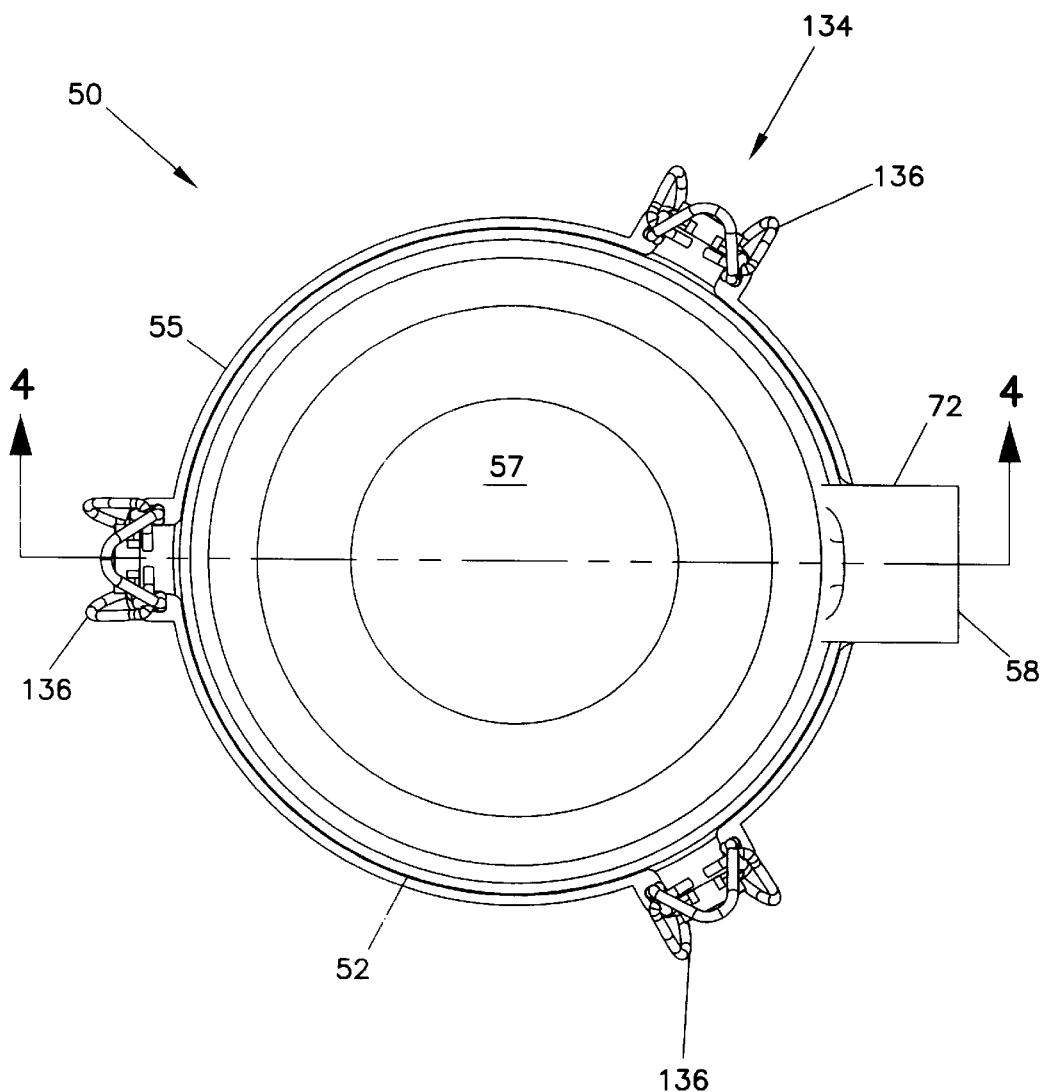
FIG. 3 is an end view of the filter arrangement depicted in FIG. 2.

Referring to FIG. 2, an embodiment of filter arrangement 36 is depicted at reference numeral 50. The filter arrangement 50 includes a housing 52. The depicted housing 52 has a two-piece construction. More specifically, housing 52 comprises a body assembly 54 and a removable cover member 56. The body assembly 54 includes body 55 and lid 57.

Figure 4:
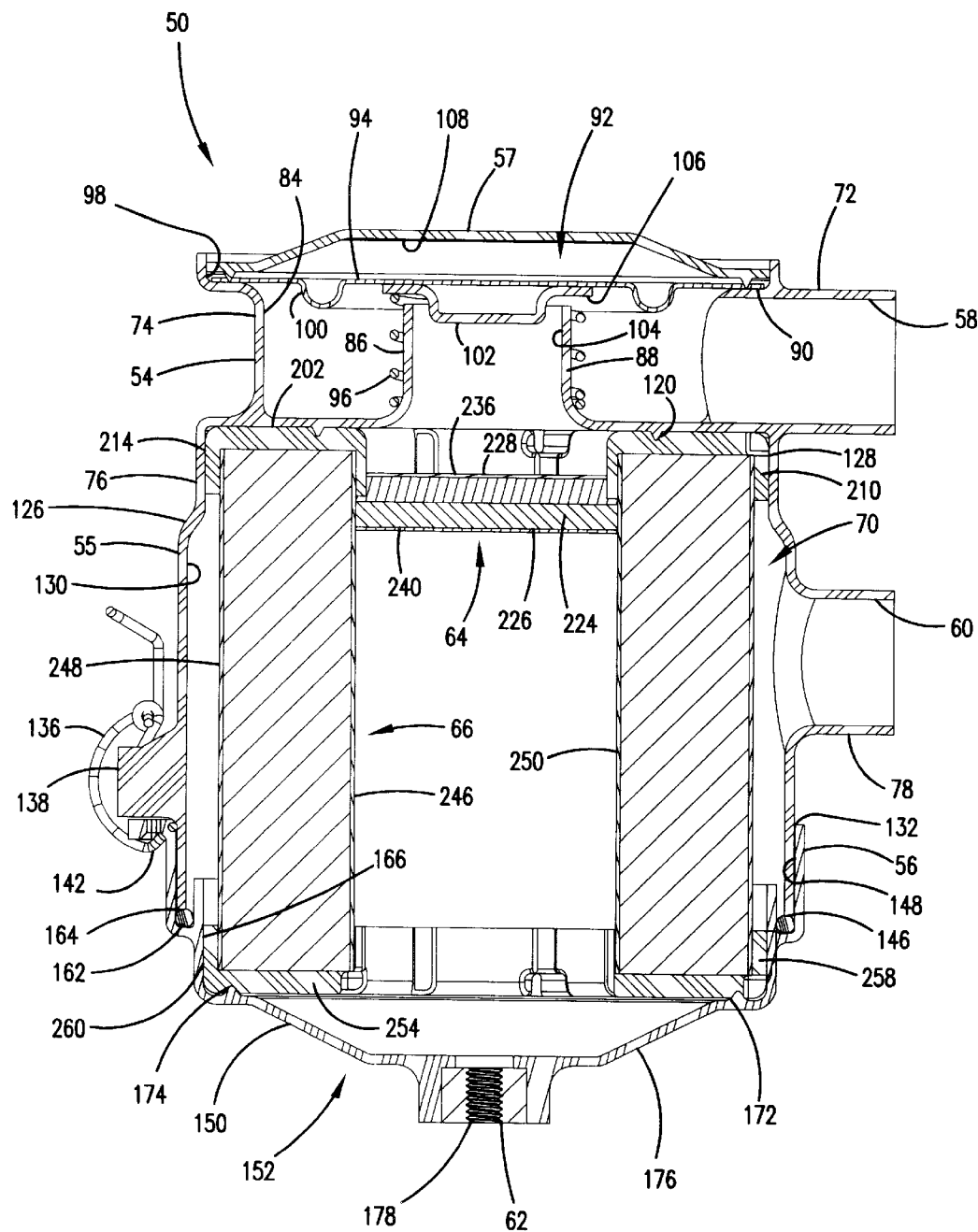
FIG. 4 is a cross-sectional view of the filter arrangement depicted in FIGS. 2 and 3, and taken along the line 4—4 of FIG. 3.

Referring to FIGS. 2 and 4, the housing 52 includes the following 3 ports: gas flow inlet port 58; gas flow outlet port 60; and liquid flow outlet port or liquid drain 62.

In general, the filter arrangement 50 may be generally referenced herein as a "multi-stage" arrangement because it includes both a coalescer filter, to remove a liquid phase from a liquid entrained gas stream and at least a single but could include multiple, downstream or second stage filters, for further purification of the air stream. In FIG. 4, a cross-sectional view of the filter arrangement 50 including both the housing 52 and its internal components are depicted. In general, the filter arrangement 50 includes a first stage coalescer filter 64, and a second stage tubular construction of filter media 66.

In use, a gas stream to be modified is directed through the inlet port 58, and through the first stage coalescer filter 64. At least a portion of the liquid phase is coalesced and removed from the gaseous stream by the first stage coalsecer filter 64. The liquid that is coalesced within the first stage coalescer filter 64 drains by gravity and exits the housing 52 through the liquid flow outlet port 62. The gas phase is directed through the second stage media construction 66. The media construction 66 removes at least a portion of particulates from the gas stream, and the cleaned gas stream is then directed outwardly from the housing 52 through the gas flow outlet 60.

Figure 5:
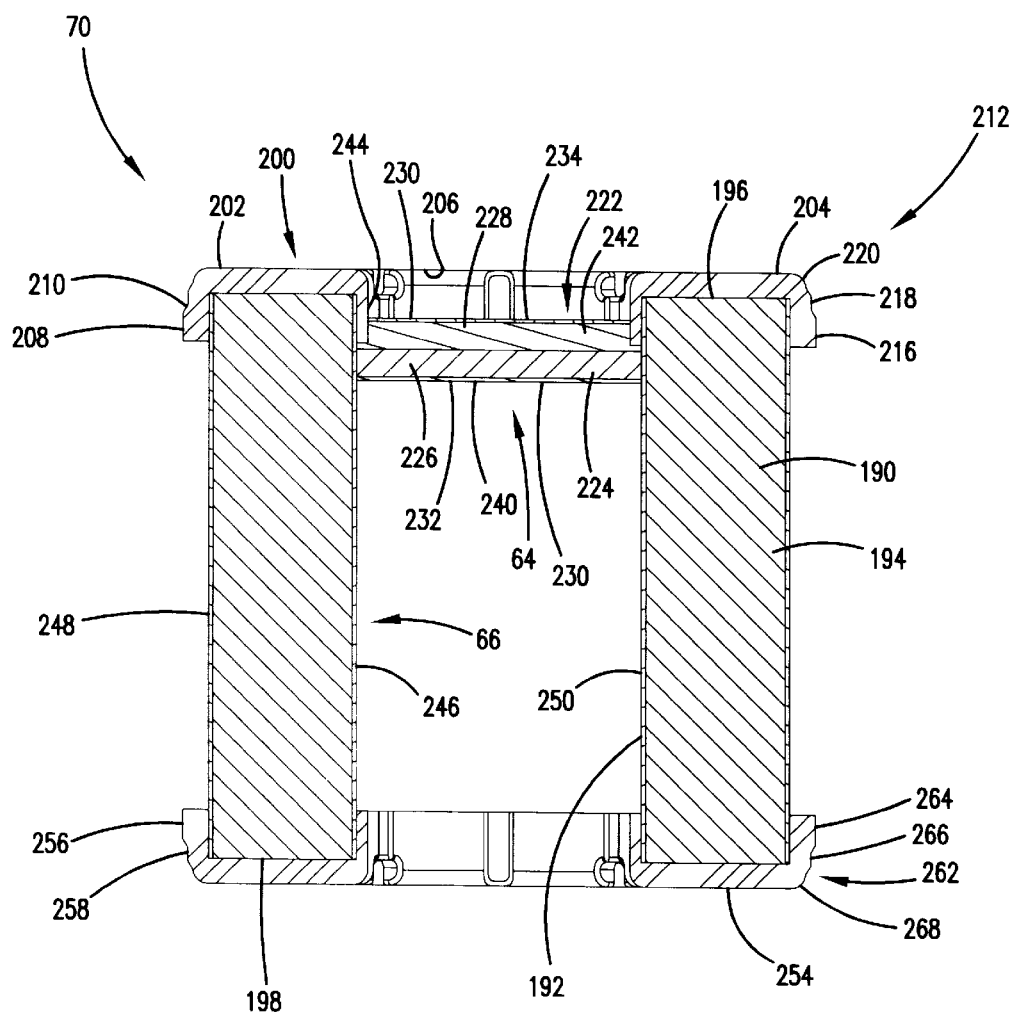
FIG. 5 is a cross-sectional view of one embodiment of a filter element utilized in the filter arrangement of FIGS. 2–4; the cross-section being the same cross-section taken along the line 4—4, but depicting the filter element removed from the housing construction.

As can be seen in FIG. 5, preferably the first stage coalescer filter 64 and second stage tubular construction of media 66 are a single, unitary construction forming a filter element 70. In the preferred embodiment illustrated, the filter element 70 is removable and replaceable from the housing 52.

In reference again to FIG. 4, for the housing 52 depicted, there is an inlet tube construction 72, a regulator valve housing 74, a canister portion 76, and a outlet tube construction 78. In the embodiment shown, each of the inlet tube construction 72, regulator valve housing 74, canister portion 76, and outlet tube construction 78 form a portion of the body 55. Together with the lid 57, the body 55 and lid 57 are part of the body assembly 54.

In the one shown, the inlet tube construction 72 is a cylindrical member 80 that defines the gas flow inlet port 58. In preferred assemblies, the inlet tube construction 78 is in gas flow communication with the crankcase of engine 30, in order to treat blow-by gases emitted from the crankcase.

The regulator valve housing 74 depicted is immediately downstream of the inlet tube construction 72. The regulator valve housing 74 includes an outer surrounding wall 82 defining an open interior 84, where the gas to be treated is allowed to flow and collect before passing into the filter element 70. The regulator valve housing 74 also includes an internal wall 86 forming a neck 88. In the one illustrated, the regulator valve housing 74 also includes a shelf 90 for holding and supporting the lid 57 thereon. The neck 88 holds and supports a regulator valve assembly 92 (FIG. 4) between the canister portion 76 and the lid 57.

In reference to FIG. 4, the valve assembly 92 is constructed and arranged to regulate the gas flow from the crankcase of the engine 30 and through the filter element 70. While a variety of valve constructions are contemplated herein, the particular valve assembly 92 depicted includes diaphragm construction 94 and a biasing mechanism, such as spring 96. In FIG. 4, note that the diaphragm construction 94 is generally circular with an outermost rim 98 that is held by and rests upon shelf 90. The diaphragm construction 94 also includes a groove 100 having a generally U-shaped cross-section and being generally circular, in plan view. The groove 100 is inboard of the rim 98. The groove 100 helps to keep the diaphragm construction 94 properly oriented and centered upon the neck 88. Secured to the diaphragm construction 94 is a centering projection 102. The centering projection 102 is sized to extend into the interior portion 104 of the neck 88. In the one shown, the centering projection 102 is secured to the diaphragm construction 94 in a region inboard of the groove 100. The centering projection 102, together with the groove 100, helps to keep the diaphragm construction 94 properly oriented over the neck 88.

Still in reference to FIG. 4, in the particular valve assembly 92 shown, the spring 96 rests around the outside wall 86 of the neck 88. The spring 96 applies a force to the diaphragm construction 94 to pull the diaphragm construction 94 in a direction toward the neck 88 and toward the filter element 70. Note that there is a gap 106 between the diaphragm construction 94 and the neck 88. The gap 106 allows for gas flow from the interior 84 of the regulator valve housing 74 and into the interior portion 104 of the neck 88.

In operation, the valve assembly 92 generally operates to limit the amount of gas flow from the engine crankcase 30 to the filter element 70. The spring 96 pulls the diaphragm construction 94 toward the neck 88 against the pressure exerted by the gas flow inwardly from the gas flow inlet 58. The diaphragm construction 94 is constructed of a flexible material, such as rubber. As such, a diaphragm construction 94 is allowed to flex in a direction away from the neck 88 and toward the lid 57 in the volume 108 defined between the lid 57 and the shelf 90 of the regulator valve housing 74.

Figure 6:
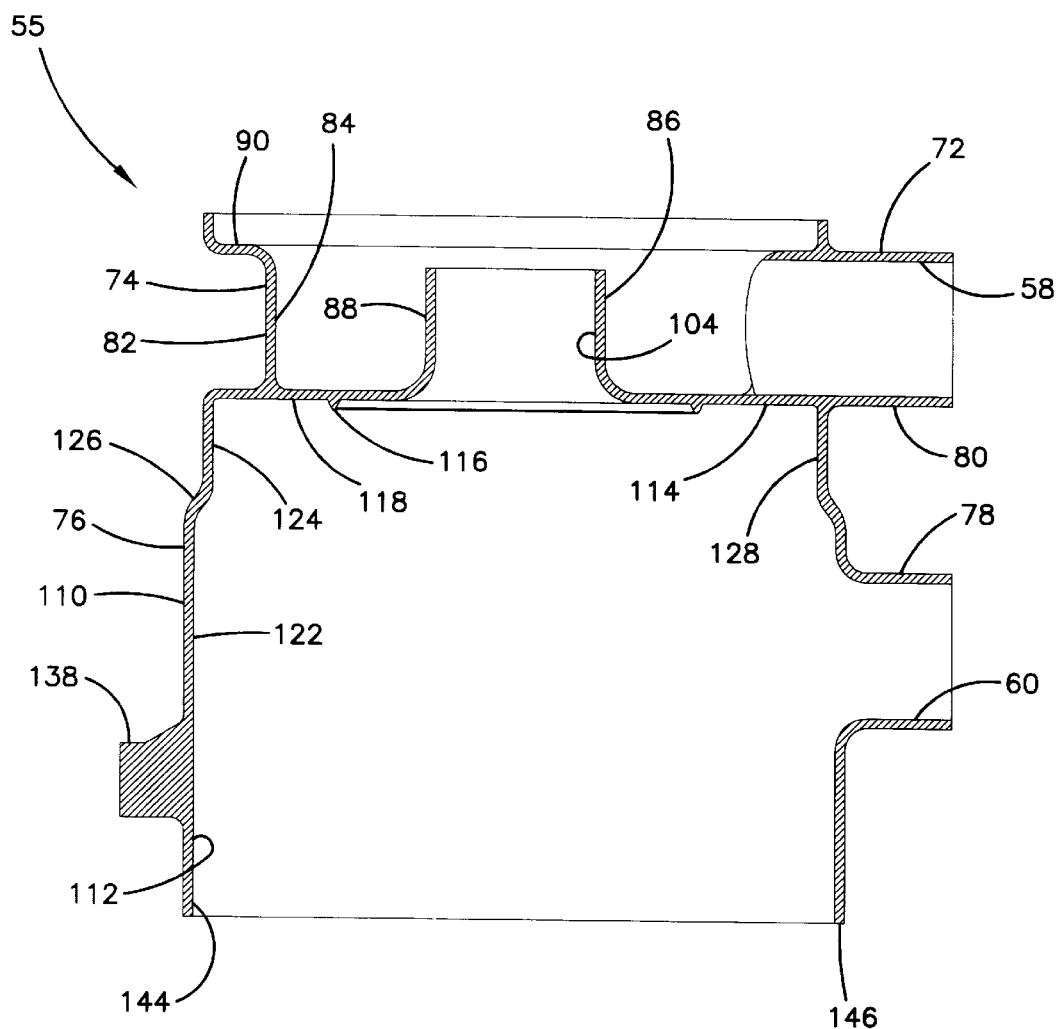
FIG. 6 is a cross-sectional view of one embodiment of the housing construction body; the cross-section being analogous to the cross-section taken along the line 4—4, but depicting only the housing construction body and with a lid removed.

In reference now to FIG. 6, the canister portion 76 of the body 55 includes an outer surrounding wall 110, that is generally tubular in construction to define an open interior 112 for receipt of the filter element 70. In the one depicted, the wall 110 generally is cylindrical to define a circular cross-section. The canister 76 includes an end wall 114 that helps to hold and contain the filter element 70 inside of the canister 76. The end wall 114 includes a projection 116 extending from a flat, planar portion 118. When the filter element 70 is operably assembled within the housing 52, the projection 116 will act as a secondary, or supplemental sealing mechanism to create a secondary seal 120 (FIG. 4) between the end wall 114 of the body 55 and the element 70. It should be appreciated that the primary sealing function is in a radial sealing system between the filter element 70 and the housing 52, which is described in further detail below. The secondary seal 120 helps to prevent unintended amounts of oil seepage from passing along the end wall 114 between the filter element 70 and the housing 52.

Still in reference to FIG. 6, note that the body 55 includes a first tubular region 122 having a first greatest outer dimension and a second tubular region 124 having a second greatest outer dimension. In the particular example illustrated, the greatest outer dimensions of the tubular region 122 and tubular region 124 are diameters. The diameter of the tubular region 122 is greater than the diameter of the tubular region 124, to create a stepped region 126 therebetween. The tubular region 124 defines an inner, annular sealing surface 128. As will be described further below, the sealing surface creates a surface of which it can accept pressure of a seal member to create a radial seal therebetween. The tubular region 122 is spaced from the filter element 70, when the filter element 70 is operably assembled therein, to create a gas flow volume 130 therebetween.

As can be seen in FIG. 2, the body assembly 54 and the cover member 56 are joined to one another along a seam 132 by a latch arrangement 134. The latch arrangement 134 includes a plurality of latches 136 that are used to securely hold the cover member 56 and body assembly 54 together along the seam 132. The latches 136 allow the cover member 56 to be selectively removed from the body assembly 54 in order to access internal components, such as filter element 70 during servicing. There can be a number of latches, and in the particular embodiment illustrated, there are three latches 136. As can be seen in FIGS. 2, 4, and 6, the body 55 includes a latch mount 138 thereon for each of the latches 136. In FIG. 2, it can be seen that the cover member 56 includes appropriate latch receiving structure, such as a slot 140, for receiving a hook portion 142 of each of the latches 136.

The body 55 has an open end 144 (FIG. 6) that is opposite of the end wall 114, in the illustrated embodiment. The open end 144 is circumscribed by a rim 146 that is for communicating with a receiving slot 148 (FIG. 7) in the cover member 56.

Figure 7:
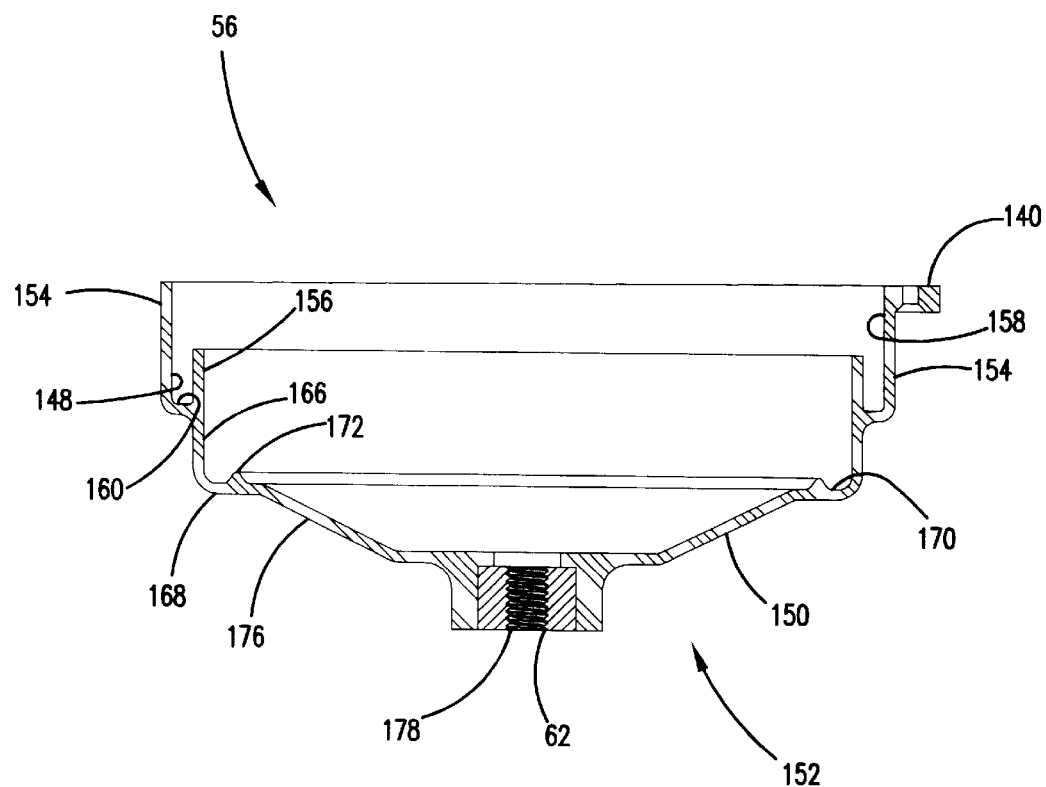
FIG. 7 is a cross-sectional view of one embodiment of the housing construction cover member; the cross-section being analogous to the cross-section taken along the line 4—4, but depicting only the housing construction cover member.

Turning now to the cover member 56 illustrated in FIG. 7, note that the cover member 56 has a bowl or funnel-shaped end second 150. The combination of bowl 150 and drain 62 comprises a liquid collection arrangement 152. In use, as liquid coalesces within the housing 52, it will drain downwardly toward the bowl 150 and will be funneled to the drain 62. Typically, appropriate drain lines will be secured to the drain 62 to direct the collected liquid as desired, for example, to an oil sump.

In reference to FIG. 7, still further detail of the illustrated cover member 56 is shown. In the particular embodiment illustrated, in the cover member 56 includes and outer surrounding wall 154 and an inner wall 156 spaced from the outer wall 154. The outer wall 154 and the inner wall 156 together define the slot 148. The slot 148 functions as a volume 158 for receipt of the body assembly 54, in particular, the rim 146. The outer surrounding wall 154 also includes the latch receiving structure 140.

The volume 158 also provides a seat 160 for holding and containing a gasket member such as O-ring 162 (FIG. 4). In the construction shown, the O-ring 162 is between the rim 146 and the seat 160. The latch arrangement 154 provides axial forces to squeeze the cover member 56 and body assembly 54 together. This provides a force of the rim 146 on the O-ring 162 to create a seal 164 (FIG. 4) between the cover member 56 and body assembly 54. This seal 164 prevents unintended amounts of gas flow to flow between the body assembly 54 and the cover member 56. Rather, the seal 164 forces the gas flow to exit through the gas flow outlet 60.

In reference again to FIG. 7, the inner wall 156 provides an annular, sealing surface 166. The annular sealing surface 166 provides a structure against which a sealing portion of the filter element 70 is oriented to create a radial seal therewith. This is described in further detail below.

The cover member 56 also includes an end wall 168 that is generally normal to the inner wall 156. The end wall 168 acts as a stop 170 for orientation of the filter element 70. In other words, the stop 170 prevents the filter element 70 from moving axially within the housing 52. Extending from the end wall 168 is a projection 172. When filter element 70 is operably installed within housing 52, the projection 172 will be pressed against a sealing portion of the filter element 70 to create a secondary seal 174 (FIG. 4) with the filter element 70. The secondary seal 174 will help to prevent unintended amounts of oil seepage from traveling from within the filter element 70 to the volume 130 outside of the filter element 70. Again, the primary sealing function is accomplished by a radial sealing system, to be described further below.

Extending from the end wall 168 is a slopped wall 176 that terminates in the liquid flow outlet 62. The slopped wall 176 forms the funnel shaped section or bowl 150.

Note that the liquid flow outlet 62 includes a threaded section 178. Threaded section 178 can be a brass insert, and is convenient for connecting fittings to lead to an oil sump, for example.

Herein, the term "gas flow direction arrangement" or variants thereof will sometimes be used to refer to the portions of arrangements that direct gas flow. For filter arrangement 50, FIG. 4, this would include the gas flow inlet 58, the inlet tube construction 72, the various walls of the housing 52 (including the walls 82, 86, 110, and 154) and the outlet tube construction 78, including the gas flow outlet 60. The gas flow direction arrangement generally operates to ensure proper gas flow, through the filter element 70 in proper order.

Attention is now directed to FIGS. 4 and 5. The filter element 70 is shown in FIG. 4 operably assembled within the housing 52. By the term "operably assembled" and variants thereof, it is meant that the filter element 70 is oriented within the housing 52 such that the seals are in place and gas flow is permitted to flow properly from the inlet 58, through the filter element 70, and out through the outlet 60.

It can be seen in FIGS. 4 and 5 that the filter element 70 includes both the first stage coalescer filter 64 and the second stage tubular construction media of 66 in a single construction. When the filter element 70 is handled, for example during servicing, both the first stage coalescer filter 64 and the second stage tubular construction of media are handled together. In general, the tubular construction of media 66 includes a media pack 190 arranged in a closed, tubular form to define an open filter interior 192. In preferred constructions, the media pack 190 will be configured to have a generally cylindrical shape, defining a circular cross section.

In certain preferred arrangements, the media pack 190 includes pleated media 194 defining a plurality of pleats through which gas to be treated is forced to flow through. The pleated media 194 acts as a polishing filter to remove at least some particulates and debris from the gas stream, before exiting the housing 52 through the gas flow outlet 60.

The pleated media 194 has a first end 196 and an opposite, second end 198. The length of the individual pleats of the pleated media 194 extends between the first end 196 and second end 198. In the filter element 70 shown, at the first end 196 is a first end cap arrangement 200. In the particular embodiment shown in FIG. 5, the end cap arrangement 200 includes an end cap 202 and the first stage coalescer filter 64. In preferred constructions, the end cap arrangement 200 is a single, unitary structure.

In preferred embodiments, the end cap 202 includes a ring 204 of a molded, polymeric material. The ring 204 defines a center aperture 206 that, in the preferred embodiment illustrated, is centered in the ring 204. By "centered", it is meant that the aperture 206 has a center of symmetry that is the same as the center of symmetry of the ring 204. In other words, the center 206 is not eccentrically disposed within the ring 204.

In preferred arrangements, the center aperture 206 will be circular and have a diameter that is not greater than about 50 percent of the diameter of the ring 204. In some arrangements, the diameter of the aperture 206 will be less than 40 percent of the diameter of the ring 204.

The ring 204 also includes an outer, annular surface 208. When filter element 70 is operably assembled within housing 52, the outer annular sealing surface 208 functions as a sealing portion 210. In preferred arrangements, the sealing portion 210 includes a stepped construction 212.

In particular, the stepped construction 212 helps with the insertion and formation of a radial seal 214 (FIG. 4) between the end-cap arrangement 200 and the sealing surface 128 of the housing 52. In FIG. 5, the stepped construction 212 includes a first region of largest diameter 216, adjacent to a second region 218 of a diameter smaller than the first region 216, adjacent to a third region 220 of a diameter smaller than that of the second region 218. This stepped construction 212 of decreasing diameters, results in a construction that helps with the insertion of the filter element 70 in the body 55.

The sealing portion 210 of the end cap 202 is preferably made from a compressible material, such that there is radial compression of the sealing portion 210 against the sealing surface 128, when the element is operably installed in the housing 52. Example, usable materials for the sealing portion 210, and preferably the entire end cap 202, are described below. In general, preferred end caps 202 will comprise a soft, polyurethane foam having an as-molded density of about 14–22 lbs. per cubic foot.

Still in reference to FIG. 5, the end cap arrangement 200 also includes a frame construction 222 oriented in the center aperture 206 of the ring 204. The frame construction 222 holds, contains, and encapsulates a region of fibrous media 224. In the construction shown, the fibrous media 224 is used as the first stage coalescer filter 64. In certain preferred arrangements, the fibrous media 224 comprises at least one layer, and typically, a plurality of layers 226 of nonwoven, nonpleated, non open tubular, coalescing media. In the embodiment shown in FIG. 5, there are two layers 226, 228 of fibrous media 224. Certain usable, example materials for the fibrous media 224 are described further below.

Still in reference to FIG. 5, in the frame construction 220 depicted, the frame construction 222 is a multi-piece, in particular, a two-piece construction including a first frame piece 230 and a second frame piece 232. The first frame piece 230 includes a support grid 234 in covering relation to the upstream face 236 of the fibrous media 224. The support grid 234 is a porous, mesh that permits gas flow to flow therethrough and across the fibrous media 224. The support grid 234 provides structural support to the fibrous media 224.

Similarly, the second frame piece 232 includes a support grid 238 in covering relation to the downstream face 240 of the fibrous media 224. The support grid 238 also provides structural support for the fibrous media 224, while permitting gas flow to penetrate therethrough and into the open filter interior 192.

In the arrangement shown, the first frame piece 230 and the second frame piece 232 are arranged adjacent to each other to form a pocket 242 between the support grid 234 and support grid 238 that holds or encapsulates the fibrous media 224. In certain arrangements, the first frame piece 230 and the second frame piece 232 fit together, such as by snap engagement.

As can be seen in FIG. 5, in the embodiment depicted, the frame construction 222 is molded or embedded within the polymeric end cap 202, along the inner annular region 244 of the ring 204.

The filter element 70 further includes an inner support liner 246 and an outer support liner 248. Each of the inner liner 246 and outer liner 248 extends between the first end 196 and second end 198 of the media pack 190. The inner liner 246 and outer liner 248 help to support the pleated media 194. The liners 246 and 248, in typical arrangements, are constructed of a plastic, porous structure that permits gas flow therethrough. The outer liner 248 circumscribes the pleated media 194 and the region of fibrous media 224.

In the particular embodiment illustrated in FIG. 5, the inner liner 246 is an integral, unitary part of the second frame piece 232. That is, the inner liner 246 and the second frame piece 232 are a single member. The inner liner 246 also forms a drain surface 250 for allowing the drippage and flow of coalesced liquid from the first stage coalescer filter 64 down to the bowl 150.

The filter element 70 also includes an end cap 254 at the second end 198 of the media pack 190. The end cap 254 preferably is constructed of a molded, polymeric material, such that the pleated media 194 is potted or embedded therewithin. Similarly, the inner liner 246 and the outer liner 248, in certain preferred embodiments, extend between and are embedded within the molded, polymeric material of the first end cap 202 and second end cap 254. The second end cap 254 includes an outer annular surface 256 that forms a sealing portion 258. Preferably, the sealing portion 258 is compressible, such that it is squeezed against the sealing surface 166 of the cover member 56 when the filter element 70 is operably installed within the housing 52.

Attention is directed to FIG. 4. When the filter element 70 is operably installed within the housing 52, the sealing portion 258 is compressed between and against the sealing surface 166 and the outer support liner 248 to form a radial seal 260 therebetween. As can be also seen in FIG. 4, the sealing portion 210 of the first end cap 202 is compressed between and against the sealing surface 128 and the outer support liner 248 to form radial seal 214 therebetween. The radial seals 214, 260 provide for the primary sealing system within the filter arrangement 50. The radial seals 214, 260 prevent unintended amounts of gas flow to bypass either one or both of the first stage coalescer filter 64 and second stage polishing filter 66.

Attention is again directed to FIG. 5. The sealing portion 258 of the end cap 254 also preferably includes a stepped construction 262. The stepped construction 262 is analogous to the stepped construction 212 of end cap 202. In the particular embodiment illustrated, there are three steps of decreasing diameter, including step 264, step 266, and step 268. Again, the stepped construction 262 helps in insertion of the filter element 70 in the housing 52 and the formation of radial seal 260.

The end cap 254 preferably comprises a molded, polymeric material, such as molded polyurethane foam having an as-molded density of about 14–22 lbs. per cubic foot. One example material is described further below.

Note that when the end caps 202 and 254 are molded in place, the end caps 202, 254; the first and second plastic extensions 246, 248; the pleated media 194; and the non-pleated, non-woven fibrous media 24 are secured together in the form of unitary, cylindrical filter element 70.

Figure 8:
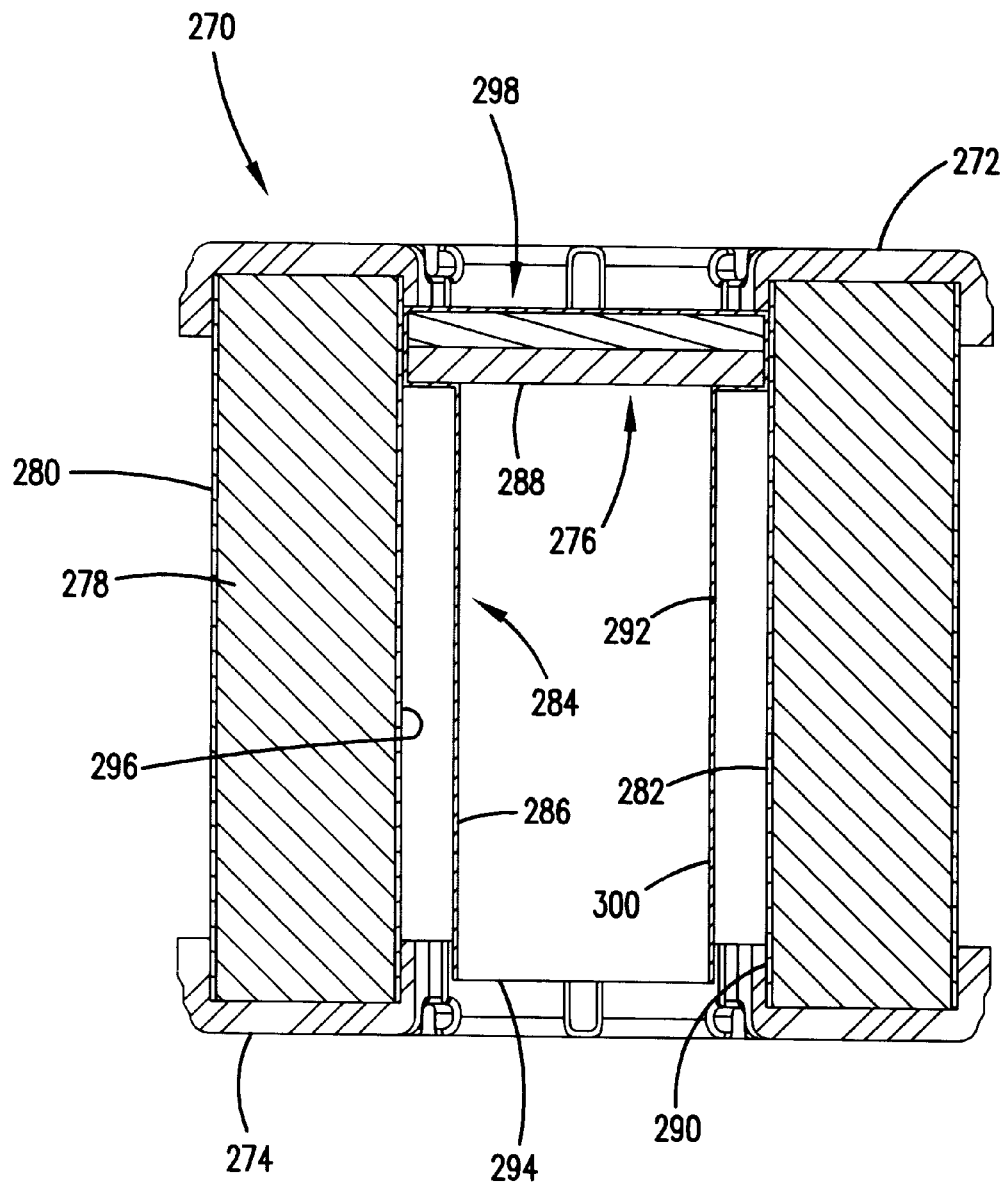
FIG. 8 is a cross-sectional view of a first alternative embodiment of a filter element that can be utilized in the filter arrangement of FIGS. 2–4; the cross-section being analogous to the cross-section of FIG. 5.

An alternative embodiment of filter element 70 is illustrated in FIG. 8 at reference numeral 270. Element 270 is analogous to the element 70 of FIG. 5, in that it includes end cap 272, end cap 274, a region of fibrous media 276, pleated media 278, and an outer liner 280. The element 270 further includes an inner support liner 282 potted within, and extending between the end caps 272, 274. In this embodiment, there is further included a flow construction 284 to aid in draining liquid that has been coalesced by the fibrous media 276.

In the embodiment illustrated in FIG. 8, the flow construction 284 includes a tube 286. In typical arrangements, the tube 286 extends from the downstream flow face 288 of the coalescer media 276 to the aperture 290 of the end cap 274. The length of the tube 286 can vary between about 33%–95% of the total length of the pleated media 278. In preferred embodiments, the tube 286 will be constructed of a generally gas impermeable material, such that gas flow is required to exit from the downstream flow face 288, through the tube interior 292, past the end tip 294 of the tube 286, and then up into the volume 296 before flowing through the pleated media 278. The volume 296 is the region between the inner liner 282 and the tube 286.

In the embodiment depicted, the tube 286 is part of a frame construction 298 that is used to trap, encapsulate, or hold the fibrous media 276. Typically, the frame construction 298 will be molded within the end cap 272.

The tube 286 will aid in the drainage of coalesced liquid (typically oil). In operation, the coalesced liquid will drain by gravity along the inside wall 300 of the tube 286, and then drip into the bowl 150, and then exit through the liquid flow outlet 62. The tube 286 will help to prevent coalesced liquid from being drawn into the pleated media 278.

Figure 9:
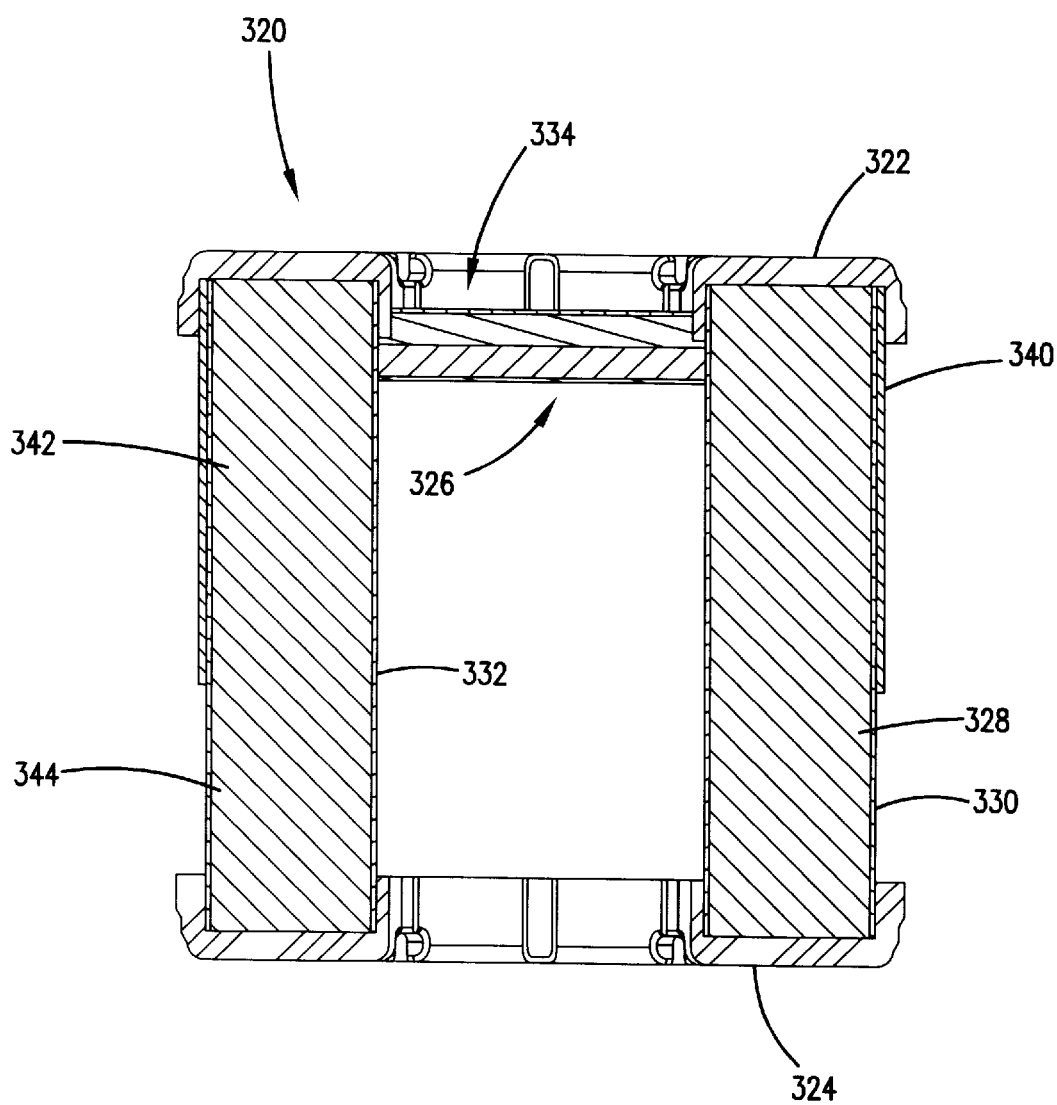
FIG. 9 is a cross-sectional view of a second alternative embodiment of a filter element that can be utilized in the filter arrangement of FIGS. 2–4; the cross-section being analogous to the cross-section of FIG. 5.

Another alternative embodiment of filter element 70 is illustrated in FIG. 9 at reference numeral 320. Element 320 is analogous to the element 70 of FIG. 5, in that it includes end cap 322, end cap 324, a region of fibrous media 326, pleated media 328, an outer liner 330, an inner liner 332, and a frame construction 334 encapsulating the fibrous media 326. The element 320 further includes an impervious outer wrap 340 circumscribing and in covering relation to the outer liner 330.

In the embodiment depicted, the outer wrap 340 extends between about 25–75% of the length of the pleated media 328, typically from the end cap 322 (holding the fibrous media 326) toward the other end cap 324 (stopping short of the end cap 324). The outer wrap 340 aids in draining liquid that has been coalesced by the fibrous media 326, as explained further. In particular, the outer wrap 340 helps to prevent gas flow through the region 342 of pleated media 328 that is masked by the wrap 340. This encourages gas flow to travel further in the direction toward the end cap 324, and to the region 344 of media 326 that is not masked by the wrap 340. This helps in the drainage by gravity of coalesced liquid out of the element 320.

A. Example Operation and Changeout

In operation, the filter arrangement 50 works as follows. Blow-by gases from an engine crankcase are taken in through the gas flow inlet port 58. The gases pass into the interior 84 of the regulator valve housing 74. The valve assembly 92 permits passage of the gas through the gap 106 between the diaphragm construction 94 and the neck 88. The gap 106 become larger as the pressure from the engine crankcase increases, causing the diaphragm construction 94 to move against the spring 96 and into the volume 108 against the lid 57. The gas then flows into the interior portion 104 of the neck 88. From there, it passes through the first stage coalescer filter 64. The first stage coalescer filter 64 is secured within the construction such that the gas is directed through the first stage coalescer filter 64 before the gas is directed through the pleated media 194.

In particular the gas flow passes through the support grid 234 and into the layer 228 of fibrous media 224. The gas continues to flow downstream and through the layer 226, and then through the support grid 238. The fibrous media 224 separates liquids, with any entrained solids, from the rest of the gas stream. The liquid flows out of the media 224 and either drips directly into the bowl 150, or drains along the drain surface 250 of the inner liner 246. The collected liquid flows along the sloped wall 176 and ultimately through the liquid flow outlet 62. This liquid material often is oil, and may be recycled to the crankcase to be reused.

The gas stream that is not coalesced by the first stage coalescer filter 64 continues on to the second stage filter 66. Specifically, the gas flow travels from the open filter interior 192 through the pleated media 194. The gas flow is prevented from bypassing this media due to the radial seals 214, 260. The pleated media 194 removes additional particles and solids from the gas stream. In the orientation shown in FIG. 4, the pleated media 194 has vertically directed pleats, such that particles and any further liquid collects or agglomerates on the pleats and falls or drain by gravity downwardly toward the bowl 150. The filtered gas then exits through the gas flow outlet port 60. From there, the gases may be directed, for example, to the turbo 34 of engine 30.

It should be noted that secondary seals 120, 174 prevent unintended amounts of collected liquid, such as oil, from seeping between the filter element 70 and the housing 52.

The filter arrangement 50 is serviced as follows. The cover member 56 is removed from the body assembly 54 by releasing the latches 136. This permits the cover member 56 to be removed from the body assembly 54. When the cover member 56 is removed from the body assembly 54, the seal 164 between the body 55 and cover member 56 is released. Further, the radial seal 260 between the filter element 70 and the cover member 56 is released. This also provides access to the filter element 70, which includes both the first stage coalescer filter 64 and the second stage tubular construction of media 66. The end of the filter element 70 adjacent to the end cap 254 is grasped, and the filter element 70 is pulled in an axial direction from the interior 112 of the body 55. As the filter element 70 is pulled from the interior 112, the radial seal 214 is released. This step removes simultaneously both the first stage coalescer filter 64 and the second stage polishing filter 66. This filter element 70 may then be disposed of, such as by incineration.

A second, new, replacement filter element 70 is then provided. The replacement element 70 also includes the first stage coalescer filter 64 and the second stage polishing filter 66 in an analogous construction as the initial filter element 70. The replacement element 70 including both the first stage 64 and second stage 66 is inserted through the open end 144 of the body 55. The filter element 70 is oriented such that the sealing portion 210 of the end cap 202 is compressed between and against the sealing surface 128 and the outer liner 248 to form radial seal 214 therebetween. In preferred embodiments, the filter element 70 is also oriented such that the end cap 202 engages and abuts the end wall 114 of the body 55. Next, the cover member 56 is placed over the end of the filter element 70 and oriented such that the sealing portion 258 of the end cap 254 is compressed between and against the outer liner 248 and the sealing surface 166 of the cover member 56. This creates the radial seal 260. In preferred arrangements, the filter element 70 is also oriented such that the end cap 254 axially engages and abuts the stop 170 of the cover member 56.

With both radial seals 214 and 260 in place, the cover member 56 is then locked to the body assembly 54 by engaging the latches 136. This also helps to create the seal 164 between the cover member 56 and body 55.

B. Example Constructions and Systems

The filter arrangement 36 is useful on a 1.5 liter–16 liter engine, 50–1200 hp, turbo charged, or super charged, diesel, or natural gas. In one application, the engine is a 250–400 hp, V-8 engine. The engine has a piston displacement of at least 3 liters, typically 7–14 liters. It typically has 8–16 cfm of blow-by gases generated. Preferred filter arrangements 36 can handle blow-by gases from 1–20 cfm.

In other systems, the filter arrangement 36 is useful on engines with the following powers: 8 kw–450 kw (11–600 hp); 450–900 kw (600–1200 hp); and greater than 900 kw (>1200 hp). In general, as the power of the engine increases, the second stage pleated media 194 will be increased in surface area. For example, for engine powers 8 kw–450 kw (11–600 hp), the length of the pleats will be about 4–5 inches; for engine powers 450–900 kw (600–1200 hp), the length of the pleats will be about 6–8 inches; and for engine powers greater than 900 kw (>1200 hp), there will typically be more than one filter arrangement 36 utilized. In other words, for engine powers greater than 900 kw (>1200 hp), there will be used two filter arrangements 36, each one having a second stage pleated media 194 with a pleat length of 4–7 inches.

It will be understood that a wide variety of specific configurations and applications are feasible, using techniques described herein. The following dimensions are typical examples:

| Structure | At least (in.) | No greater than (in.) | Typical (in.) |
|---|---|---|---|
| outer diameter of element 70 | 2 | 12 | 4–5 |
| inner diameter of element 70 | 0.5 | 10 | 1.5–2.5 |
| length of element 70 | 3 | 12 | 4–6 |
| diameter of media 224 | 0.5 | 10 | 2–2.5 |
| thickness of each layer 226, 228 | 0.05 | 1 | 0.1–0.3 |
| diameter of inlet 58 | 0.5 | 3 | 1–1.5 |
| diameter of gas flow outlet 60 | 0.5 | 3 | 1–1.5 |
| diameter of neck 88 | 0.5 | 3 | 1–1.5 |
| height of projection 116 | 0.01 | 0.25 | 0.05–0.1 |
| diameter of open end 144 | 3 | 14 | 4.5–5.5 |
| diameter of lid 57 | 3 | 14 | 4.5–5.5 |
| diameter of diaphragm 96 | 3 | 14 | 4.5–5 |
| diameter of inner wall 156 | 3 | 13 | 4.5–5 |
| diameter of outer wall 154 | 3 | 14 | 5–5.5 |
| diameter of liquid flow outlet 62 | 0.05 | 2 | 0.1–0.5 |
| height of projection 172 | 0.01 | 0.25 | 0.05–0.1 |
| length of housings 2 | 4 | 15 | 7–8 |

C. Example Materials

In this section, certain example materials useful for the embodiment of FIGS. 2–7 are described. A variety of materials may be used, other than those described herein.

The housing 50 can be plastic, such as carbon filled nylon.

The media 224 of the coalescer 64 is generally non-pleated, non-cylindrical, polyester fibrous media having an average fiber diameter of less than about 18 microns, typically about 12.5 microns and a percent solidity, free state, of no greater than about 1.05%. The media 224 has an upstream and a downstream exposed surface area of at least 1 in.$^2$, no greater than about 7 in.$^2$, and typically about 3–4 in.$^2$. The material has an average fiber diameter of 1.5 denier (about 12.5 micron), and a solidity in a free state of at least 0.85%. It has a weight of, typically, greater than about 3.1 ounces per square yard. Typically, it has a weight less than 3.8 ounces per square yard. Typical weights are within the range of 3.1–3.8 ounces per square yard (105–129 grams per square meter). Typically, the media has a thickness at 0.002 psi compression (free thickness) of greater than about 0.32 inches. Typically, the media has a thickness at 0.002 psi compression (free thickness) of less than about 0.42 inches. Typical free thicknesses for the media are in the range of 0.32–0.42 inches (8.1–10.7 millimeters). The media has a typical permeability of no less than about 370 feet per minute (113 meters per minute).

The end caps 202, 254 may be a polymeric material. In particular, the end caps 202, 254 can be urethane, and more particularly, foamed polyurethane. One example foamed polyurethane is described in commonly assigned U.S. Pat. No. 5,669,949 for end cap 3, herein incorporated by reference. The material can be the following polyurethane, processed to an end product (soft urethane foam) having an "as molded" density of 14–22 pounds per cubic foot (lbs/ft$^3$) and which exhibits a softness such that a 25% deflection requires about a 10 psi pressure. In some embodiments, the "as molded" density varies from the 14–22 lbs/ft$^3$ range. The polyurethane comprises a material made with I35453R resin and I3050U isocyanate. The materials should be mixed in a mix ratio of 100 parts I35453 resin to 36.2 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70–95° F. The mold temperatures should be 115–135° F.

The resin material I35453R has the following description:
(a) Average molecular weight
  1) Base polyether polyol=500–15,000
  2) Diols=60–10,000
  3) Triols=500–15,000
(b) Average functionality
  1) total system=1.5–3.2
(c) Hydroxyl number
  1) total systems=100–300
(d) Catalysts
  1) amine=Air Products 0.1–3.0 PPH
  2) tin=Witco 0.01–0.5 PPH
(e) Surfactants
  1) total system=0.1–2.0 PPH
(f) Water
  1) total system=0.03–3.0 PPH
(g) Pigments/dyes
  1) total system=1–5% carbon black
(h) Blowing agent
  1) 0.1–6.0% HFC 134A.

The I3050U isocyanate description is as follows:
(a) NCO content—22.4–23.4 wt %
(b) Viscosity, cps at 25° C.=600–800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The materials I35453R and I3050U are available from BASF Corporation, Wyandotte, Mich. 48192.

The frame construction 222, inner liner 246, outer liner 248, and screens 234, 238 can be constructed of plastic, such as carbon filled nylon.

The pleated media tubular filter 194 is preferably constructed of an oleo-phobic material. One example is synthetic glass fiber filter medium, coated and corrugated to enhance performance in ambient air-oil mist conditions. The media 194 has a face velocity of at least 0.1 ft/min., no greater than 5 ft/min., and typically about 0.3–0.6 ft./min. The pleat depth is no less than 0.5 in., no greater than 3 in., and typically about 0.75–2 in. The pleat length is at least 1 in., no greater than 15 in., and typically 3–6 in. The pleated media 194 has an upstream media surface area of at least 2 ft$^2$ and preferably about 3–5 ft$^2$. There are at least 30 pleats, no greater than about 150 pleats, and typically about 60–100 pleats. The synthetic glass fiber filter media may be coated with a low surface energy material, such as an aliphatic fluorocarbon material, available from 3M of St. Paul, Minn. Prior to coating and corrugating, the media has a weight of at least 80 pounds/3000 sq. ft; no greater than about 88 pounds/3000 sq. ft; typically in a range from about 80–88 pounds/3000 square feet (136.8±6.5 grams per square meter). The media has a thickness of 0.027±0.004 inches (0.69±0.10 millimeters); a pore size of about 41–53 microns; a resin content of about 21–27%; a burst strength, wet off the machine of 13–23 psi (124±34 kPa); a burst strength wet after 5 minutes at 300° F. of 37±12 psi (255±83 kPa); a burst strength ratio of about 0.30–0.60; and a permeability of 33±6 feet per minute (10.1±1.8 meters per minute). After corrugating and coating, the media has the following properties: corrugation depth of about 0.023–0.027 inches (0.58–0.69 millimeters); a wet tensile strength of about 6–10 pounds per inch (3.6±0.91 kilograms per inch); and a dry burst strength after corrugating of no less than 30 psi (207 kPa).

The ratio of the upstream surface area of the coalescer media 224 to the upstream surface area of the pleated media 194 is less than 25%, typically less than 10%, and in some instances, less than 1%. The ratio of the downstream surface area of the coalescer media 224 to the upstream surface area of the pleated media 194 is less than 25%, typically less than 10%, and in some instances, less than 1%.

The housing 52 may be constructed of a molded plastic, such as glass filled nylon. The diaphragm construction 94 can be constructed of a deflectable material, such as rubber.

Other embodiments of the invention will be apparent to those skilled in the art from consideration of the specification and practice of the invention disclosed herein.

What is claimed is:

1. A filter element comprising:
    (a) a first filter media comprising a tubular extension of pleated media defining an open filter interior;
    (b) a first end cap at one end of said tubular extension of pleated media;
        (i) said first end cap having an aperture in communication with said open filter interior;
        (ii) said first end cap having an annular surface comprising a polymeric material positioned to form a radial seal with a housing construction, when the filter element is operably positioned in a housing construction;
    (c) a second end cap at an end of said tubular extension of media opposite of said first end cap;
        (i) said second end cap having an aperture in communication with said open filter interior;
        (ii) said pleated media having a length extending between said first and second end caps;
    (d) a second filter media comprising a region of fibrous media oriented in said first end cap aperture;
        (i) said region of fibrous media including first and second, opposite flow faces;
            (A) said second flow face being oriented toward said open filter interior;
            (B) said first flow face being oriented away from said open filter interior; and
    (e) a flow construction oriented in said open filter interior;
        (i) said flow construction extending from said second flow face of said region of fibrous media in a direction toward said second end cap;
        (ii) said flow construction being generally gas impermeable and oriented to direct liquid coalesced by said region of fibrous media toward said second end cap aperture.

2. A filter element according to claim 1 wherein:
    (a) said flow construction includes a tube construction having a length of 33–95% of a length of the pleated media;
        (i) said tube construction defining an interior volume and having an end tip oriented to direct gas flow from said region of fibrous media, through the tube construction interior volume, past the end tip, and into said pleated media.

3. A filter element according to claim 2 further including:
    (a) a frame construction holding said region of fibrous media;
        (i) said frame construction being secured to said first end cap;
        (ii) said frame construction including a first support grid in covering relation to said first flow face; and a second support grid in covering relation to said second flow face.

4. A filter element according to claim 3 wherein:
    (a) said frame construction and said tube construction are integral.

5. A filter element according to claim 1 wherein:
    (a) said first end cap annular surface comprises an outer annular surface.

6. A filter element according to claim 1 wherein:
    (a) said second end cap has an outer surface oriented to form a seal with a housing construction, when the filter element is operably positioned in a housing construction.

7. A filter element according to claim 6 wherein:
    (a) said second end cap outer, surface includes an outer annular surface comprising a compressible material to form a radial seal with a housing construction, when the filter element is operably positioned in a housing construction.

8. A filter element according to claim 1 wherein:
    (a) each of said first and second flow faces is oriented generally normal to said length of said pleated media.

9. A filter element according to claim 1 further including:
    (a) an outer liner extending between said first and second end caps.

10. A method of treating diesel engine blow-by gases; the method comprising steps of:
    (a) directing blow-by gases from a diesel engine to a coalescer filter; the coalescer filter being mounted in an interior of a tubular pleated media filter;
    (b) removing at least a portion of a liquid phase from the gases with the coalescer filter as a collected liquid;
    (c) after said step of removing at least a portion of the collected liquid phase, directing drainage of at least a portion of the collected liquid from the coalescer filter, through an interior of a gas impermeable inner tube oriented within the interior of the tubular pleated media filter, to a drain construction;
    (d) after said step of removing at least a portion of a liquid phase, directing the gases through the interior of the gas impermeable inner tube, around an end of the inner tube, and to the tubular pleated media filter; and
    (e) filtering at least a portion of particulates from the gases with the pleated media filter.

* * * * *